United States Patent
Schellmann

(10) Patent No.: US 6,665,057 B2
(45) Date of Patent: Dec. 16, 2003

(54) METHOD FOR DISTANCE MEASUREMENT FOR VEHICLES BY MEASURING TRANSIT TIME OF LASER PULSES

(75) Inventor: Michael Schellmann, Meschede (DE)

(73) Assignee: Hella KG Hueck & Co., Lippstadt (DE)

(*) Notice: Subject to any disclaimer, the term of this patent is extended or adjusted under 35 U.S.C. 154(b) by 0 days.

(21) Appl. No.: 10/106,332

(22) Filed: Mar. 27, 2002

(65) Prior Publication Data

US 2002/0140923 A1 Oct. 3, 2002

(30) Foreign Application Priority Data

Mar. 27, 2001 (DE) .......................... 101 15 152

(51) Int. Cl.[7] .............................. G01C 3/08; B60T 7/16; B62D 1/24
(52) U.S. Cl. ...................... 356/5.06; 356/5.01; 180/167
(58) Field of Search ................................ 356/5.01–5.15; 340/435, 436; 180/167, 169; 701/301, 223, 96

(56) References Cited

U.S. PATENT DOCUMENTS

| 4,111,552 A | 9/1978 | Bodlaj | |
| 4,699,508 A | * 10/1987 | Bolkow et al. | 342/135 |
| 5,206,697 A | * 4/1993 | Schwartz | 342/131 |
| 5,359,404 A | * 10/1994 | Dunne | 342/105 |

FOREIGN PATENT DOCUMENTS

| DE | 27 23 835 | 12/1978 |
| DE | 30 20 996 A1 | 12/1981 |
| DE | 196 07 345 A1 | 8/1997 |
| DE | 197 31 754 A1 | 2/1999 |
| EP | 1 176 430 A2 | 1/2002 |

* cited by examiner

Primary Examiner—Thomas H. Tarcza
Assistant Examiner—Brian K Andrea
(74) Attorney, Agent, or Firm—Birch, Stewart, Kolasch & Birch, LLP

(57) ABSTRACT

A method of distance measurement for vehicles by transit time measurement of laser pulses employs a distance sensor including a transmitter (11) having a pulse generator (1A) for the generation of a laser pulse (L), and a receiver (12) having a transit time measurement circuit (3A) for the detection of a reflected laser pulse (RL) reflected by a target. A cover wall (2), which is partially transparent to laser radiation, defines an installation space in which these elements are arranged, with a transit time of a reflected portion (RT) of the laser pulse (L), reflected by the cover wall (2) to the receiver (12), being measured as a reference time signal for the distance measurement.

8 Claims, 2 Drawing Sheets

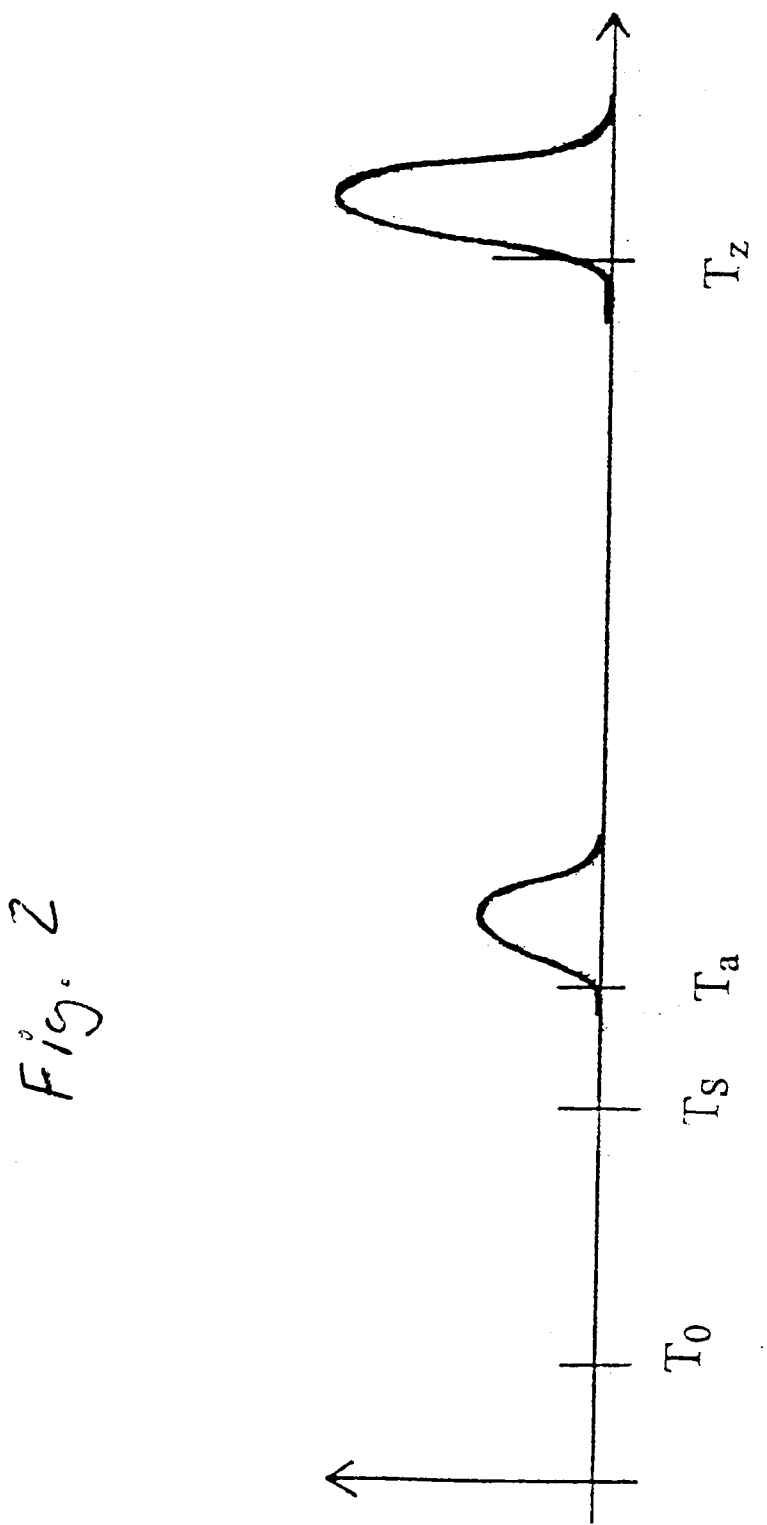

METHOD FOR DISTANCE MEASUREMENT FOR VEHICLES BY MEASURING TRANSIT TIME OF LASER PULSES

BACKGROUND OF THE INVENTION

This application claims priority from German Patent Application 101 15 152.7 filed Mar. 27, 2001, and incorporates the contents of that application herein by reference.

The present invention relates to a method for distance measurement by means of transit time measurement of laser pulses.

A measuring instrument (distance sensor) for carrying out this method is described in German Patent document DE 30 20 996 A1, for example. A laser pulse is generated by a semiconductor laser as a transmitter with an upstream pulse generator. The laser pulse reflected by a target, whose distance from the vehicle is to be measured, is detected with respect to time by a photodiode, preferably an avalanche photodiode with a downstream transit time measurement circuit. Between the turn-on (triggering) of the pulse generator at time $T_0$ and the transmission of the laser pulse at time $T_S$ as the actual start signal, there is, however, a time delay $\Delta T=T_S-T_0$. This delay depends primarily on the components used, in particular the pulse generator used, with a choice of the semiconductor laser also being a factor. If this delay were constant, it would not be critical, since it could be determined once and then taken into account in the transit time measurement as a correction value. This is not the case, however, because the delay can vary sharply, especially as a result of temperature variations. Thus, when certain components are used, the delay over the temperature range relevant for vehicles can be between 100 and 200 nanoseconds, which results in a variation of 100 nanoseconds. As a result, the start time and therewith the transit time measurement would have an imprecision of 100 nanoseconds, which would ultimately mean an imprecision in the distance measurement of 15 meters.

For this reason, DE 30 20 996 A1 proposes coupling out a portion of the laser pulse through an optical waveguide in the direction of the receiving diode as a start reference signal. The provision of an optical waveguide for this purpose is, however, very involved and expensive.

German Patent document DE 197 31 754 A1 describes integration of the aforementioned distance sensor in a headlight of a vehicle. The problem of determining the precise start time for the transit time measurement is, however, not addressed.

It is an object of this invention to provide a method for distance measurement for vehicles by measuring transit time of laser pulses, which realizes a simple, cost-effective and reliable correction of a delay, between a triggering of a pulse generator and a time of light emission of the laser pulse.

SUMMARY OF THE INVENTION

According to principles of this invention, advantage is taken of the circumstance that, when a distance sensor of the aforementioned type is integrated into a headlight, a laser pulse must pass through a light-transmissive shield cover (also called a headlight lens), which is transparent to laser radiation. For the invention, the light-transmissive shield cover is not merely a transparent design element as it is in DE 197 31 754 A1. Rather, the invention exploits the knowledge that the light-transmissive shield cover is almost completely transparent to the laser radiation, in other words, a small portion of the laser pulse is reflected back into the headlight by the light-transmissive shield cover. With appropriate beam characteristics (slightly divergent laser beam) and adequate spatial proximity between a transmitting laser and a receiving diode, this portion of the laser pulse reflected by the light-transmissive shield cover also reaches the receiving diode as measurements have demonstrated. Because the portion of the laser pulse reflected by the light-transmissive shield cover is detected with respect to time, the time of transmission of the laser pulse (the point in time when the laser starts to emit) can be determined exactly, since the distance traveled by the reflected laser beam from the transmitting laser to the light-transmissive shield cover and back to the receiving diode is always the same as a result of the fixed geometric arrangement.

In the event that the reflection from the light-transmissive shield cover is not sufficient when a conventional light-transmissive shield cover is used, provision is made in one embodiment to use a light-transmissive shield cover that is structured to be at least locally reflective so as to achieve increased reflection of a portion of the laser pulse.

Alternatively or in addition to this measure, provision is made in an embodiment to increase the sensitivity of the receiver within a specific time window in order to detect a low intensity signal reflected by the light-transmissive shield cover.

The idea upon which the invention is based is not limited to integration of the laser distance sensor into a headlight. Rather, the basic idea is to equip an installation space in which the distance sensor is arranged, with a cover wall that is almost transparent to the laser radiation (only), whereby a transit time of a portion of the laser pulse reflected by the cover wall is then measured by the receiver, as a reference time signal for the distance measurement. In general, when the laser wavelength lies outside the visible spectrum, the cover wall does not have to be transparent to visible light. The cover wall serves to protect the distance sensor from dirty water, dust, stones, etc. Thus it is possible to integrate the distance sensor into the bumper of a vehicle, for example.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a graphic plot showing the signal curves recorded by a transit time measurement circuit of the measuring instrument of FIG. 1.

DESCRIPTION OF THE PREFERRED EMBODIMENT

Figure 1:
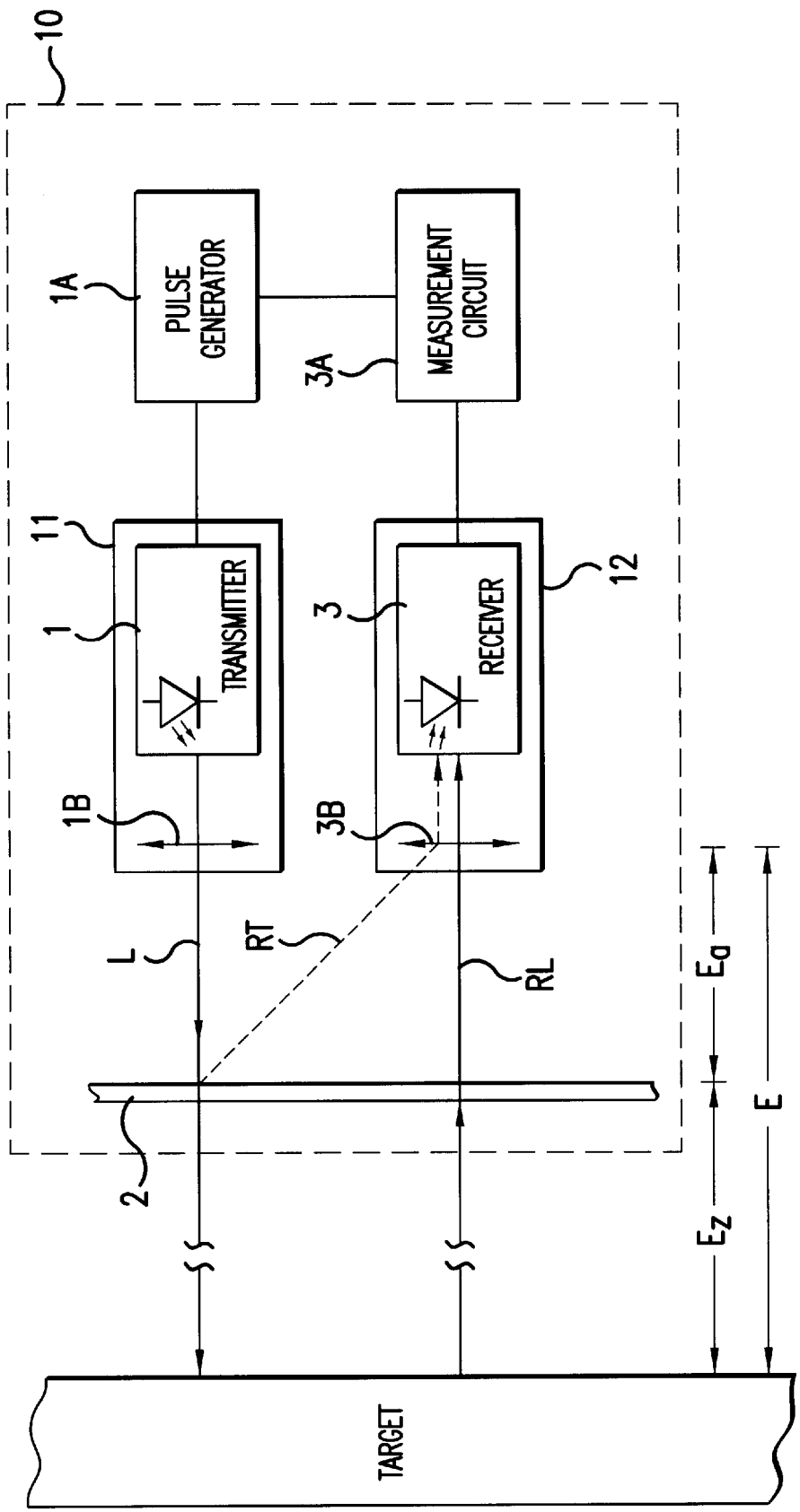
FIG. 1 is a block diagram of a headlight including a measuring instrument employing principles of this invention along with a target.

FIG. 1 shows a schematic block diagram of a measuring instrument for carrying out a method according to this invention. The dashed rectangle represents a headlight 10 in which the measuring instrument is integrated. The measuring instrument (distance sensor) includes of a semiconductor laser 1, which is a transmitter of a laser pulse whose transit time upon reflection from a target is measured for the distance determination. The semiconductor laser 1 is preceded by a pulse generator 1A. Downstream of the actual semiconductor laser 1 is an output lens 1B, with the semiconductor laser 1 and output lens 1B preferably forming one unit that is designated as a transmitter unit 11. On its way to the target, for example a vehicle traveling ahead, the laser pulse must pass through a light-transmissive shield cover 2. In this context, a distance between the output lens 1B of the transmitter unit 11 and the light-transmissive shield cover 2 is designated $E_a$. The laser pulse reflected by the target must now pass through the light-transmissive shield cover 2 and arrives at a receiving diode 3 through an input lens 3B. Here too, the input lens 3B and receiving diode 3 preferably form a receiving unit 12. The receiving diode 3 is followed by a circuit 3A for transit time measurement.

The measuring instrument functions as follows:

At time $T_0$, the pulse generator 1A generates a trigger signal, causing the semiconductor laser 1 to start. At the same time, the trigger signal serves to activate transit time measurement. Figuratively speaking, the internal clock of the transit time measurement circuit 3A is set to zero and started. With a certain time delay, the laser pulse then exits the transmitter 1 at time $T_s$. At time $T_a$, a portion of the laser pulse L reflected by the light-transmissive shield cover 2, reflected portion RT, that has reached the receiving diode 3 is detected by the transit time measurement circuit 3A. A certain time $T_z$ later, the signal reflected by the target, reflected signal RL, is detected.

FIG. 2 shows the timing diagram and the signal curves recorded by the transit time measurement circuit 3A. As is clearly visible, the amplitude of the signal RT reflected by the light-transmissive shield cover 2 is significantly smaller than the amplitude of the signal RL reflected by the target. In the embodiment shown, a threshold value (trigger threshold) is stored in the transit time measurement circuit 3A, so the signals are detected when the amplitude has exceeded this threshold value. In a preferred embodiment, which is not shown, the signals are sampled by a sample-and-hold circuit and subsequently the signal maximum, or the center of the signal curve, is determined. Additional analysis procedures are also known to those skilled in the art.

The distance between the light-transmissive shield cover 2 and the target is designated $E_z$ in FIG. 1. The distance between the transmitter 1 or its output lens 1B and the target is designated E.

The following relationship applies to the target distance to be determined:

$$E_z = \tfrac{1}{2}(T_z - T_s)c - E_a$$

The reason for the factor ½ is that the reflected laser pulse has traveled the distance twice. The quantity c represents the speed of light. The quantity $T_s$, the point in time when the laser pulse is emitted, however, is determined only imprecisely here. This imprecision is eliminated in that the transit time $T_a$ of the portion of the laser pulse RT reflected by the light-transmissive shield cover is measured as a reference time, which is the time that the laser pulse requires to cover the constant distance $E_a$ from the transmitter 1 to the light-transmissive shield cover 2:

$$E_a = \tfrac{1}{2}(T_a - T_s)c$$

By substitution in the two equations, one obtains a relationship for the target distance that no longer contains the imprecise quantity $T_s$:

$$E_z = \tfrac{1}{2}(T_z - T_a)c$$

During operation, the distance sensor generates periodic laser pulses in order to continuously determine the distance to targets ahead of the vehicle (vehicles traveling ahead of it, obstacles, lane barriers, etc.). It is not necessary in this context to measure the reflected portion RT of the laser pulse reflected by the light-transmissive shield cover 2 as a reference signal at every laser pulse. It is sufficient if this reference measurement is made only after certain time intervals or after a certain number of laser pulses.

While the invention has been particularly shown and described with reference to a preferred embodiment, it will be understood by those skilled in the art that various changes in form and detail may be made therein without departing from the spirit and scope of the invention.

What is claimed is:

1. A method of distance measurement for vehicles by measuring the transit time of laser pulses, the method comprising the steps of:

generating a laser pulse from a transmitter operatively connected to a pulse generator; and detecting a first reflected portion of said laser pulse, which is reflected by a target, by a receiver, said receiver being operatively connected to a transit time measurement circuit, wherein a cover wall, which is partially transparent to said laser pulse, is positioned between said transmitter and said target, and wherein a transit time of a second reflected portion of said laser pulse is measured, which is reflected by said cover wall into said receiver, as a reference time signal for distance measurement.

2. The method according to claim 1, wherein said cover wall is designed to be at least locally reflective so as to achieve increased reflection of a portion of said laser pulse.

3. The method according to claim 1, wherein a sensitivity of said receiver within a specific time window is increased in order to detect a low intensity signal reflected by said cover wall.

4. The method according to claim 1, wherein said cover wall is formed by a light-transmissive shield cover of a headlight.

5. A method of distance measurement, said method comprising the steps of:

generating a laser pulse from a transmitter that is operatively connected to a pulse generator;

detecting a first reflected portion of said laser pulse, which is reflected by a target, by a receiver, said receiver being operatively connected to a transit time measurement circuit;

detecting a second reflected portion of said laser pulse by said receiver, said second reflected portion being reflected by a partially transparent cover wall of a vehicle headlight, said cover wall being positioned between said transmitter and said target; and determining transit times of said first and second reflected portions for distance measurement, wherein said second reflected portion is utilized as a reference time signal for distance measurement in said transit time measurement circuit.

6. A distance measurement apparatus comprising:
- a transmitter for generating a laser pulse, said transmitter being operatively connected to a pulse generator;
- a receiver for receiving a first and second reflected portion of said laser pulse;
- a transit time measurement circuit for measuring transit times of said first and second reflected portion; and
- a partially transparent cover wall, which is positioned between said transmitter and a target, wherein said first reflected portion is reflected by said target and said second reflected portion is reflected by said cover wall, and wherein the transit time of said second reflected portion is utilized as a reference time signal for distance measurement.

7. The distance measurement apparatus according to claim 6, wherein said cover wall is a portion of a vehicle headlight cover.

8. The distance measurement apparatus according to claim 7, wherein said vehicle headlight cover is light transmissive.

* * * * *